United States Patent [19]

Wicks et al.

[11] Patent Number: 4,917,020

[45] Date of Patent: Apr. 17, 1990

[54] TRANSITION VEHICLE FOR USE WITH CONVERTIBLE RAIL-HIGHWAY TRAILERS

[75] Inventors: Harry O. Wicks, Hamburg, N.Y.; Theodore E. Dancu, Flossmoor, Ill.

[73] Assignee: The Chamberlain Group, Inc., Elmhurst, Ill.

[21] Appl. No.: 244,712

[22] Filed: Sep. 14, 1988

[51] Int. Cl.[4] ............................................. B61F 3/12
[52] U.S. Cl. ................................... 105/4.3; 105/72.2; 105/215.2
[58] Field of Search ................ 105/4.3, 72.2, 215.2, 105/215.1, 171, 185, 4.1, 189, 228; 213/78, 98, 86, 79, 188, 3; 410/45, 53

[56] References Cited

U.S. PATENT DOCUMENTS

| | | | |
|---|---|---|---|
| 3,342,141 | 9/1967 | Browne | 105/215.2 |
| 3,905,306 | 9/1975 | Janes | 105/215.2 |
| 4,202,277 | 5/1980 | Browne et al. | 105/215.2 |
| 4,202,454 | 5/1980 | Browne et al. | 213/86 |
| 4,213,400 | 7/1980 | Synder et al. | 105/189 |
| 4,416,571 | 11/1983 | Krause | 410/45 |
| 4,547,107 | 10/1985 | Krause | 105/215.2 |
| 4,669,391 | 6/1987 | Wicks et al. | 105/4.3 |
| 4,784,066 | 11/1988 | Ellis | 105/4.3 |

Primary Examiner—Andres Kashnikow
Assistant Examiner—Mark T. Le
Attorney, Agent, or Firm—Neuman, Williams, Anderson & Olson

[57] ABSTRACT

A transition vehicle for connecting convertible rail-highway trailers in a pulling or pushing relationship with the railway coupling mechanism found on a locomotive or a preceding railcar and which can also be converted for roadway use and coupled to a yard tractor for off-rail relocation. A convertible trailer is coupled to the transition vehicle through engagement of its coupling tongue and the king pin adjacent thereto, respectively, by a female coupler socket and a funnel-shaped receiving slot in a load carrying shelf mounted on top of the central tube of the transition vehicle. The convertible trailer is further secured to the transition vehicle by a clamping mechanism which grasps the trailer side walls. The transition vehicle is fitted with flanged rail wheels and a double shelf railway coupler for coupling to a locomotive or a preceding railcar when in the rail mode of use, and with tired road wheels and a telescopic gooseneck coupler for coupling to the elevated fifth wheel of a tractor when in the roadway mode of use. The tired road wheels are retractable to a stored position during rail use, and can be lowered to the ground for roadway use by inflating an air spring suspension system operatively connected thereto.

20 Claims, 5 Drawing Sheets

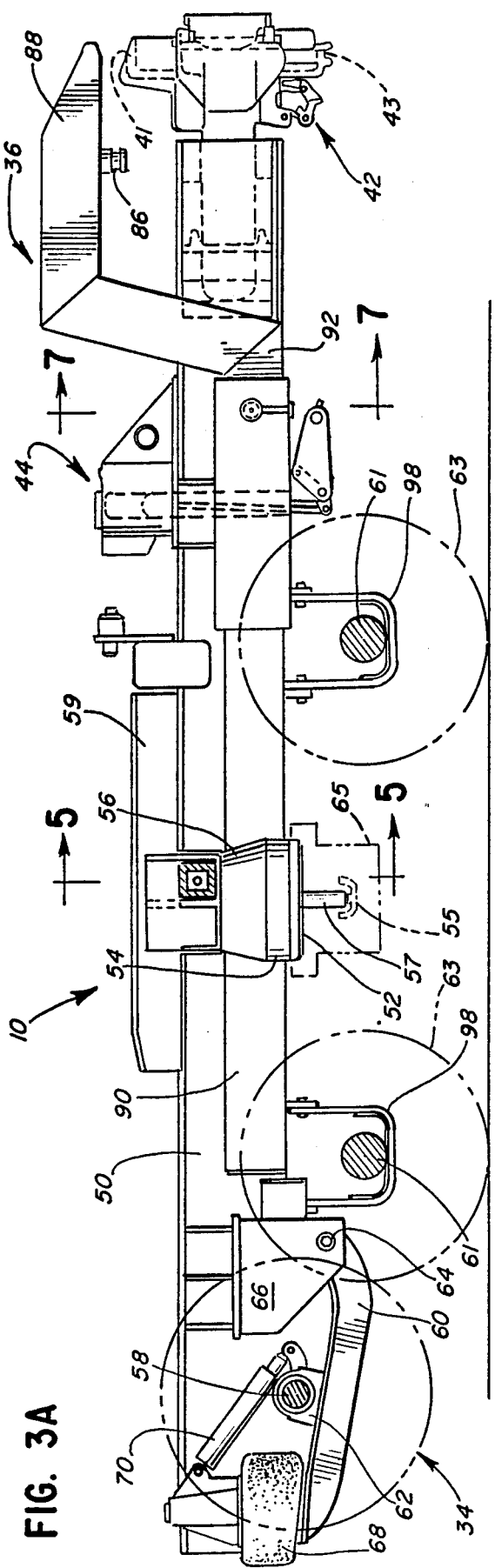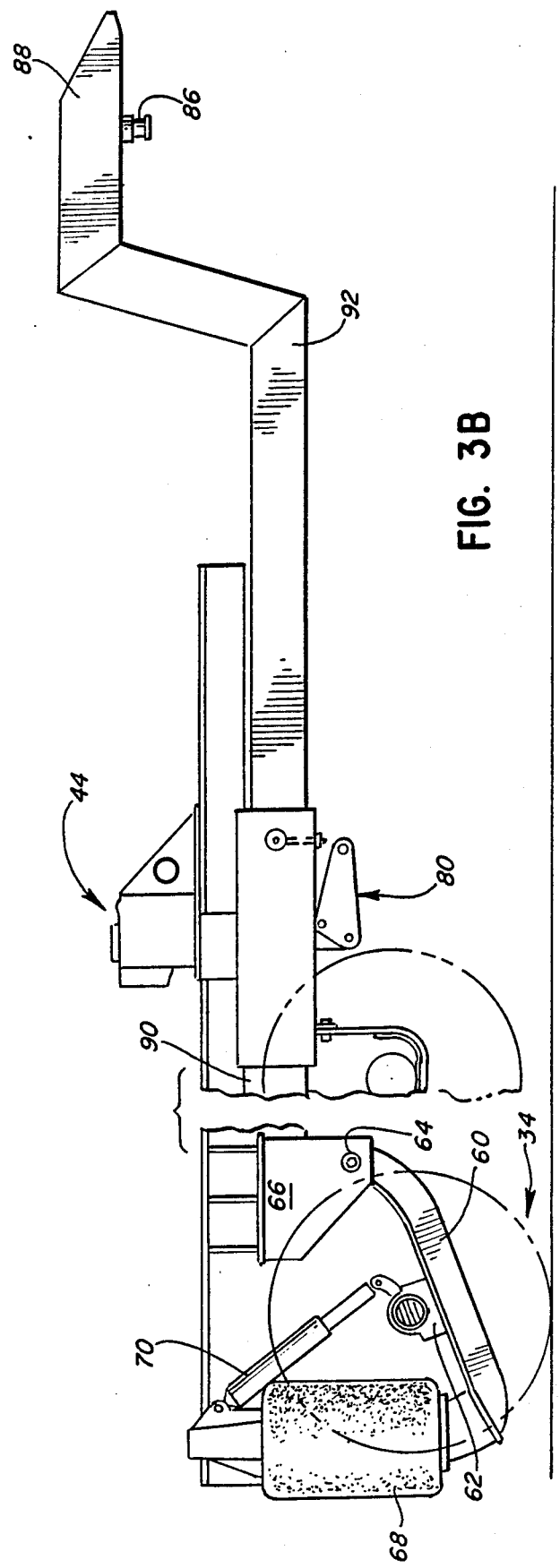
FIG. 3A
FIG. 3B

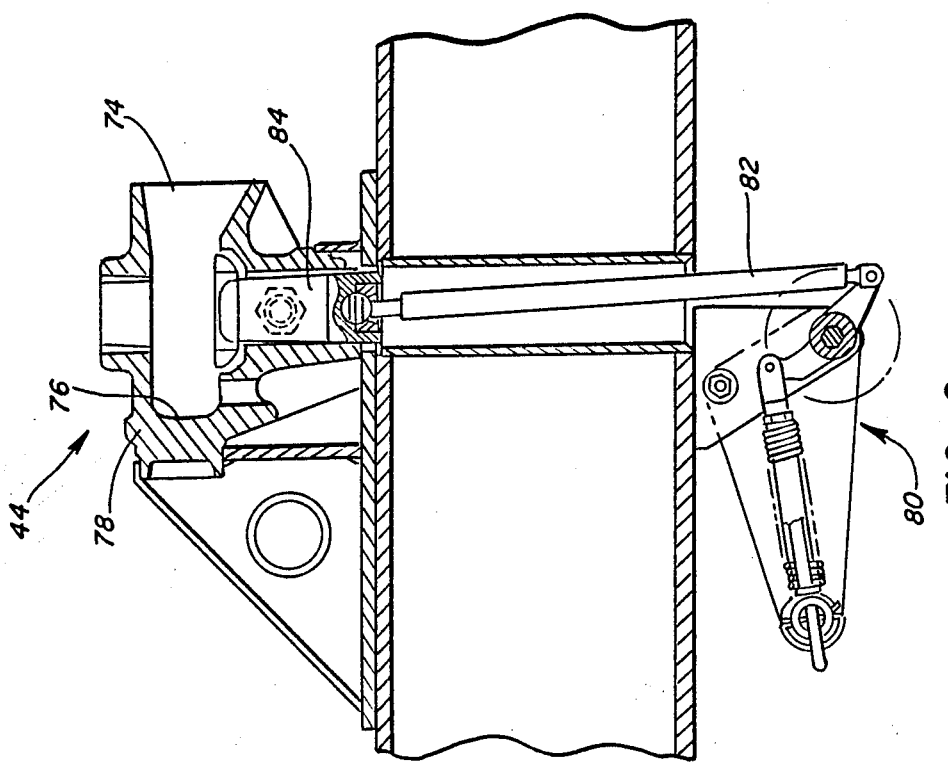

TRANSITION VEHICLE FOR USE WITH CONVERTIBLE RAIL-HIGHWAY TRAILERS

FIELD OF THE INVENTION

This invention relates generally to trains of highway trailers which have been modified to be carried over a rail track. For cross-country travel by rail and local delivery by truck, such convertible trailers eliminate the need for piggyback flat cars. Examples of such trailers can be found in U.S. Pat. No. 4,202,277. More particularly, the invention relates to a transition vehicle which can be used to connect such convertible trailers in a pulling or pushing relationship with the railway coupling means normally found on a locomotive or a preceding railcar and which can also be converted to roadway use and coupled to a yard tractor for off-rail relocation.

BACKGROUND OF THE INVENTION

The convertible rail-highway trailer to which the present invention relates has a body of conventional semi-trailer dimensions and is fitted with a coupling tongue at its front end and a female coupler at its rear end. In order to form a train of convertible trailers, a plurality of such trailers can be directly coupled end-to-end, in the manner disclosed in U.S. Pat. No. 4,202,454, or connected through an intermodal adaptor mounted on a conventional railtruck or bogie, as is disclosed in U.S. Pat. No. 4,669,391. The convertible trailer also includes a conventional king pin adjacent its front end for removable coupling to the fifth wheel of a tractor for the roadway mode of operation, thus forming an over-the-road tractor-semi-trailer combination.

As a consequence of dimensional requirements dictated by the need that such convertible trailers be both adaptable to their being pulled by a tractor when used in the roadway mode and by a locomotive or preceding railcar when in the railway mode, there is a difference in the centerline heights, relative to the top of the railroad track, between the tongue/socket connection and the locomotive railway coupling. Thus, it has been necessary to interpose a vehicle which makes the necessary height transition between the coupling components of a pushing or pulling locomotive and a first convertible trailer in a train of such trailers.

Heretofore, it has been known to create a transition vehicle by mounting a coupler socket at one end of a railway car and leaving the railway coupler at the other end of the car for pulling it by a locomotive. It is also known to adapt a convertible trailer by providing a normal railway coupler at the fore end thereof and a coupler socket at the rear end of the trailer. Each of these transition vehicles has attendant deficiencies. The use of a standard railway car results in a transition vehicle which is heavy, which must be moved on the track by a locomotive and which has performance characteristics incompatible with those of the convertible trailer it pulls. The use of a convertible trailer with a standard railway coupling at the fore end also presents an undesirable compromise. Although it provides the same performance characteristics as other intermodal vehicles in a train, it is large, expensive and incorporates elements, such as brakes for example, which may not be necessary to the limited role which the transition vehicle is called upon to perform.

SUMMARY OF THE PRESENT INVENTION

It is an object of the present invention to overcome the aforementioned deficiencies experienced with prior transition vehicles. More specifically, it is an object to provide a transition vehicle for intermodal use which is simple in construction and use, while being superior to prior art apparatus with respect to cost and performance.

It is another object of the present invention to provide a light weight transition vehicle which can be moved from place to place on roadway tires by means of a yard tractor and which can be readily converted to a railroad mode and used to connect one or more convertible trailers to a locomotive or a preceding railcar for railway use.

It is still another object of the present invention to provide a transition vehicle which incorporates coupling means which will attach to the forward end of a convertible trailer having standard coupling components and which incorporates adjustable clamping means to engage such trailer, regardless of the trailer's body size, type or configuration.

It is yet another object of this invention to provide a transition vehicle which incorporates both a standard railway coupler for connection to a locomotive or a preceding railcar and a telescopic gooseneck coupler for connection to the fifth wheel of a yard tractor.

It is yet another object of the present invention to provide a transition vehicle of such geometry that it will readily connect to intermodal vehicles in such a way as to resist forces generated by pulling and braking within an attached train of intermodal vehicles.

It is a still further object of this invention to provide a transition vehicle which incorporates to a large extent standard railtruck components, such as a standard railway coupler and a standard railway bogie, and is therefore economical in construction and operation.

These and other objects of the invention will be apparent hereinafter from the specification which describes the best mode of practicing the invention as currently known, its use and operation, and a preferred embodiment. Reference should also be made to the drawings, which constitute a part of the disclosure, and the subject matter claimed.

Generally, the foregoing objects of the present invention are attained by a structure which comprises a vehicle body in the form of a central tube supported on a circular centerplate or thrust bearing configured to allow rotating and limited rocking movement within the bowl of a railtruck bolster supporting the central tube, a load carrying shelf mounted on the upper surface of the central tube for supporting the lower surface of a convertible trailer and receiving and engaging a king pin mounted near the front end of such trailer, a female coupler socket for engaging the coupling tongue of such trailer, a pair of opposing clamps adjustably mounted transversely to the central tube to grasp the side rails of the trailer, a telescopic gooseneck coupler for coupling with the fifth wheel of a yard tractor formed of two tubes slidingly engaged at one end in two pockets fixedly mounted alongside the central tube and secured at the opposite end to a horizontal support plate and king pin, a railway coupler near the leading end of the central tube for connecting the structure to a locomotive coupler or a preceding railcar for rail use, a railtruck for engaging a rail during rail use, a retractable roadway wheel-set axle unit and an air spring suspension system operatively connected to the central tube and the wheel-set axle unit to permit the selective lowering of the roadway wheel-set axle unit into a ground engaging position for roadway use, and support loops depending from the bottom of the central tube and enclosing the axles of the rail wheel-set axle unit to restrain the centerplate of the structure from becoming disengaged from the bowl of the bolster when the central tube is lifted by a yard tractor using the telescopic gooseneck coupler.

In accordance with the present invention, a transition vehicle located in the yard can be relocated by a yard tractor of the type commonly known in the railroad industry as a hostling tractor or a yard hostler. The yard tractor is positioned in front of the transition vehicle and the gooseneck coupler on the transition vehicle is extended and coupled to the fifth wheel of the yard tractor. The air spring suspension system is then inflated to lower the roadway wheel-set axle unit and the yard tractor's fifth wheel is raised, thereby raising the rail wheel-set axle unit clear of the track and the ground. The transition vehicle can then be transported to a rail site for installation in a train of convertible trailers. Once the transition vehicle is positioned in front of the train of trailers, the air spring suspension system is deflated to raise the wheel-set axle unit and the yard tractor's fifth wheel is lowered to permit the transition vehicle's rail wheel-set to engage the rail track. The transition vehicle is then backed underneath the first intermodal trailer in the train such that they are coupled by engagement of the trailer's tongue and the transition vehicle's female coupler socket, and of the trailer king pin and a receptacle therefor in the load carrying shelf. The gooseneck coupler is then disconnected from the yard tractor and retracted, and the yard tractor is pulled away. A locomotive or a preceding railcar can then be backed up to the transition vehicle to effect coupling at the railway coupler near the leading end of the transition vehicle.

From the description thus far provided, it is apparent that the proposed transition vehicle may be used in a number of intermodal applications advantageously over such devices as are known in the art.

BRIEF DESCRIPTION OF THE DRAWINGS

For a more complete understanding of the invention, reference should be made to the drawings, briefly described below:

FIG. 3A is a side elevational view of the transition vehicle of the present invention with the railtruck sideframes not being shown and the roadway and rail wheels shown in phantom.

FIG. 3B is an exploded side elevational view of the transition vehicle showing an inflated air spring on the road wheel suspension and an extended gooseneck coupler at the leading end of the vehicle.

FIG. 8 is a sectional side elevational view of the female coupler socket of the present invention.

DESCRIPTION OF THE PREFERRED EMBODIMENT

Figure 1:
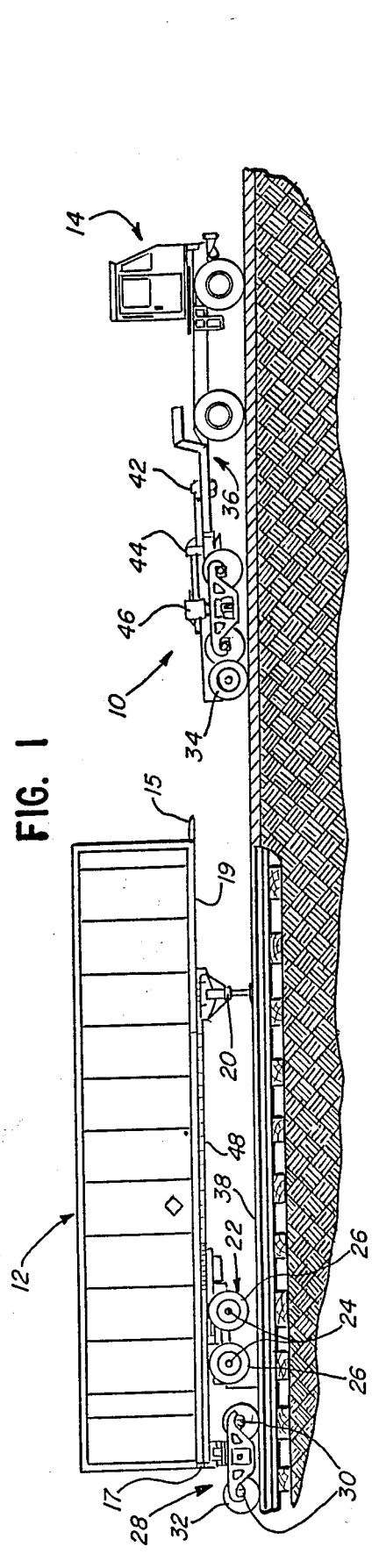
FIG. 1 is a diagrammatic side elevational view showing the transition vehicle of the present invention, coupled to a yard tractor and configured in the roadway mode of operation, as it is being backed for engagement with a convertible trailer for rail operation.
Figure 2:
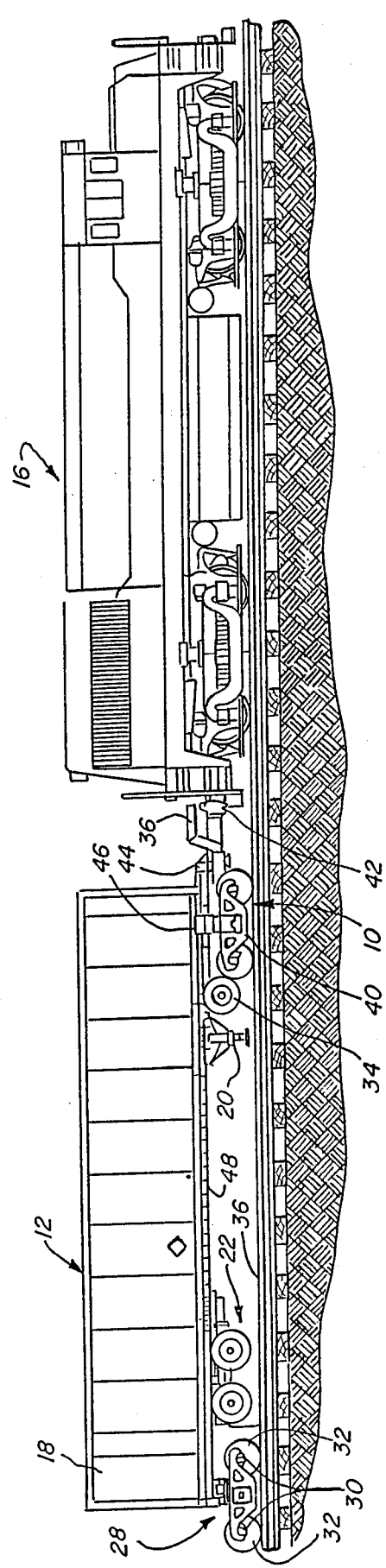
FIG. 2 is a diagrammatic side elevational view showing the transition vehicle of the present invention installed between a locomotive and a convertible trailer.

The present invention provides a transition vehicle 10 which can be used to connect a convertible trailer 12 to either a road vehicle 14, as shown in FIG. 1, or a locomotive 16, as shown in FIG. 2. To assist in understanding the invention, like numbers will be used to denote similar parts throughout the several accompanying figures and in the discussion below.

The convertible trailer 12 includes a body 18 of conventional semi-trailer dimensions and has a coupling tongue 15 at its front end and a female coupler socket 17 at its rear end to receive the coupling tongue of an adjacent trailer to form a train for the rail mode of operation. The convertible trailer 12 also includes a king pin 19 adjacent its front end for removable coupling to the fifth wheel of a tractor or truck for the roadway mode of operation. Additionally, convertible trailer 12 includes conventionally placed trailer landing gear 20 and roadway running gear 22, including tandem axles 24 (although a single suspension can be used) with each axle mounting dual tired wheels 26. During rail use, convertible trailer 12 has or is fitted with a railroad bogie 28, which includes tandem axles 30 (again, a single axle can be used) each having a pair of flanged railroad wheels 32.

In the most common uses of the present invention, the road vehicle would be a yard tractor, and such roadway use would be limited to yard activity, such as moving a transition vehicle between a storage location and a rail track or between tracks. It will be appreciated, however, that the transition vehicle 10 can be suitably equipped for highway-rated use and still accomplish all of the functions and provide all of the advantages of the present invention.

In the illustration of FIG. 1, the transition vehicle 10 is shown configured for roadway use and connected to hostling tractor 14. The transition vehicle 10 is shown positioned to be backed up to the first in a train of convertible trailers on a rail track. On the trailer 12, the landing gear 20 is lowered and the tired wheels 26 are the ground surface. Rail bogie 28 has been placed underneath the rear end of trailer 12 and on rail 38. Flanged railroad wheels 32 are in contact with rail 38. On the transition vehicle 10, the roadway wheel-set axle unit 34 is lowered into a ground engaging position and the gooseneck coupler 36 is extended out from the transition vehicle and coupled to the fifth wheel of tractor 14.

Conversely, FIG. 2 shows the transition vehicle 10 configured for the rail mode of travel and installed between trailer 12 and locomotive 16. The landing gear 20 on trailer 12 is lifted. On the transition vehicle 10, the roadway wheel-set axle unit 34 has been raised and the rail wheel-set axle unit 40 is resting on rail 38. Gooseneck coupler 36 is retracted and transition vehicle 10 is coupled to locomotive 16 through railway coupler 42.

In the rail mode of operation, convertible trailer 12 is coupled to transition vehicle 10 utilizing the trailer tongue 15 and king pin 19, in a manner described more fully hereinbelow. The female coupler socket 44, which receives the coupler tongue of trailer 12, is seen in FIGS. 1 and 2. In addition to this coupling, trailer 12 is further secured to vehicle 10 with clamping means 46, which engages side rails 48 along the sides of trailer 12.

Figure 4:
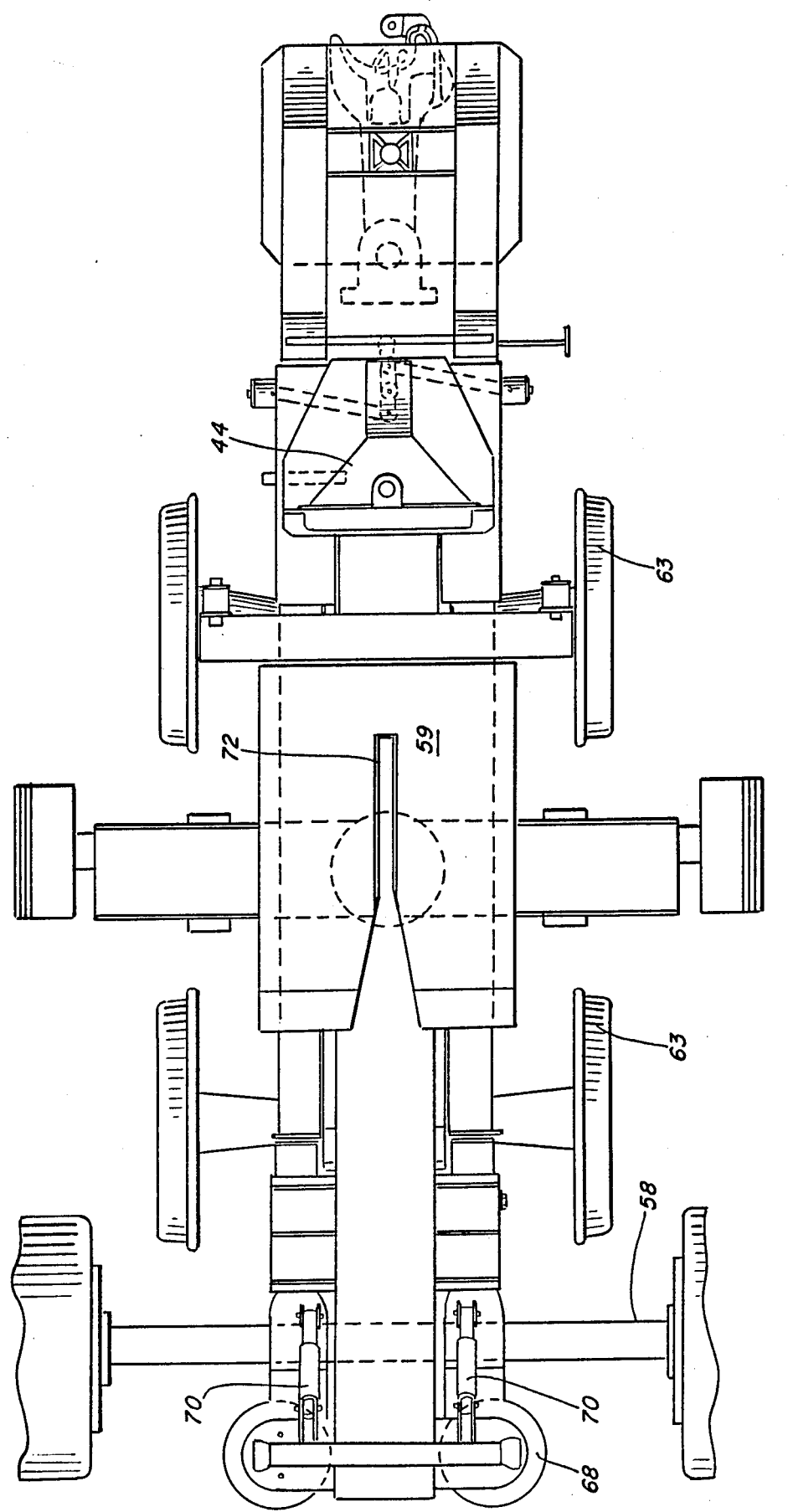
FIG. 4 is a plan view showing the load carrying shelf of the present invention.

Referring now to FIGS. 3A, 3B and 4, the transition vehicle 10 of the present invention will be described in greater detail. The vehicle is built around a central structural member, also known as a draft sill, which in the preferred embodiment takes the form of a long rectangular tube 50 running through the center of the vehicle. The inside dimensions of the central tube 50 are approximately 12-½ inches vertical by 12-⅞ inches horizontal. Railway coupler 42, sometimes referred to as a drawbar, is mounted in the front of central tube 50, and the other coupling components are mounted on the central tube. On the lower surface of tube 50, and approximately 10 feet from the railway coupler end, is mounted a standard diameter thrust bearing or centerplate 52 which fits into a comparable diameter centerplate bowl 54 in the bolster 65 of the railtruck. A downwardly projecting shaft 57 fits into an aperture 55 in the railtruck bolster 65, below the centerplate bowl. The aperture acts as a guide for the motion of shaft 57 and permits limited side-to-side rocking movement of the transition vehicle while restricting fore and aft rocking. Railtruck bolster 65 and shaft 57 running therethrough thus permit rotating and limited rocking movement of the central tube 50 with respect to its longitudinal axis. Gravity loads on the load carrying shelf 59 of the transition vehicle 10 are transmitted along a normal load path to the centerplate 52 and then to the vehicle body bolster 56. The rail wheel-set axle unit 40 of the rail bogie of the present invention includes tandem axles 61, with each axle having a pair of flanged railroad wheels 63. The railtrack bolster 65, in combination with side frames, springs and rail wheel-set axle unit 40, comprise a conventional rail bogie, except for the fact that the rail bogie of the present invention does not require brakes.

At the rear end of the central tube 50 is mounted the air spring means and lifting mechanism for the roadway wheel-set axle unit 34 of transition vehicle 10. In this connection, reference is particularly made to FIGS. 3A and 3B. Suitable air spring suspension systems for this application are embodied in commercially available apparatus such as, for example, Model ARR-655-157-120 marketed by Neway Division, Lear Siegler, Inc., Muskegon, Mich. There are two such mechanisms coacting at opposed ends of wheel axle 58, and each comprises a trailing arm 60 substantially on the center of which is mounted a bracket 62 which prevents the axle 58 from rotating and positions the axle on the trailing arm 60. One end of the trailing arm is pivoted for movement around a transverse axis as at 64 to a bracket 66 which is bolted to the central tube 50. At the other end of the trailing arm 60, is mounted a conventional trailer air spring 68 which is secured at its upper end to the central tube.

The mounting of this suspension differs from the customary manner in that the left hand trailing arm is mounted on the right hand side of the central tube and vice-versa. This mounting arrangement has the effect of moving the arms inward to 25 inch centers rather than the normal 35 inch centers, thus allowing a more compact design. The spring centers remain at the normal 30 inches and the suspension is mounted to a standard 96 inch wide highway axle 58. Two tires, such as Dunlop 255/70R-22.5 tires, having a load capacity of approximately 6,000 lbs. each (at low speeds) and a diameter of 36.4 inches, are selected for use in the preferred embodiment. The combination of the small tires, the 96 inch axle and the 25 inch arm centers affords ample clearance for the wheels of the railtruck to swivel 10 degrees.

In converting the transition vehicle 10 from the roadway mode to the rail mode, the air from the bag 68 is released, thereby allowing the roadway wheel-set axle unit 34 to be raised by a spring mechanism which is common to air spring suspensions of the type thus far described. To convert the transition vehicle from the rail mode to the roadway mode, the air bag 68 is pressurized and the roadway wheel-set axle unit 34 is caused to engage the ground. Shock absorber 70 limits the downward motion of highway axle 58.

Convertible trailer 12 is coupled to transition vehicle 10 by coupling components mounted to the top of the central tube 50. These coupling components are best illustrated in accompanying FIGS. 3A, 4 and 8. When the transition vehicle is backed underneath the front end of a convertible trailer for coupling thereto, the tongue of the trailer is received by and coupled to the female coupler socket 44 mounted to the top surface of the central tube 50. At the same time, the trailer king pin, depending downwardly from the bottom of the front end of the trailer, is received by the load carrying shelf 59 on top of the central tube 50. In the preferred embodiment of the present invention, load carrying shelf 59 has an elongated slot with a funnel-shaped entranceway which is shaped to engage and vertically retain the annular groove in the king pin and which can also accommodate a variety of king pin spacings relative to the front of the trailer. With its king pin engaged, a portion of the trailer's lower surface rests upon the load carrying shelf 59 in much the same fashion as the trailer would lie on a fifth wheel if the trailer were mounted to a tractor. When a convertible trailer 12 is so coupled with the transition vehicle 10 of the present invention, the gravity load of the front end of the trailer resting on the load carrying shelf is transmitted through the centerplate 52 to the railtruck bolster 65.

Female coupler socket 44 is of a type commonly used today in intermodal transportation vehicles, and is described in U.S. Pat. No. 4,202,454. To facilitate an understanding of the present invention, a brief description of its operation will be provided, with particular reference to components shown in FIG. 8. Not shown are the details of the male coupler tongue on the trailer, which include a vertical hole around which is a spherical bearing. In operation of this coupler, the trailer tongue enters the tapered female opening 74 until its nose abuts the surface 76 of the casting 78. A coupler linkage 80 is then employed to actuate a coupler pin operating link 82 and in turn coupler pin 84, to raise coupler pin 84 upwardly through the vertical hole in the coupler tongue. The centerline of the coupler pin 84 is approximately 52 inches forward of the centerline of the load carrying plate 59. This distance is required to overcome the overturning moment generated by the difference in height of the locomotive's or preceding vehicle's railway coupling and the trailer's socket when the transition vehicle 10 is pulled by a locomotive or a preceding railcar.

It is within the scope of this invention to use a pneumatic or hydraulic linkage instead of the mechanical coupling pin actuation linkage shown in FIG. 8. One could, for example, use a pneumatic cylinder mounted on the lower surface of the central tube 50 with its cylinder rod projecting upward through holes in the upper and lower walls of the central tube and the end of such cylinder rod attached to the coupler pin 84. Such a cylinder would be designed with a compression spring which holds the coupling pin 84 in a normally "up" position. When air is introduced into the cylinder, it would actuate the coupling pin downward. It is within the scope of this invention to use a variety of linkages to effect the insertion of coupler pin 84 through the hole in the trailer tongue.

Figure 7:
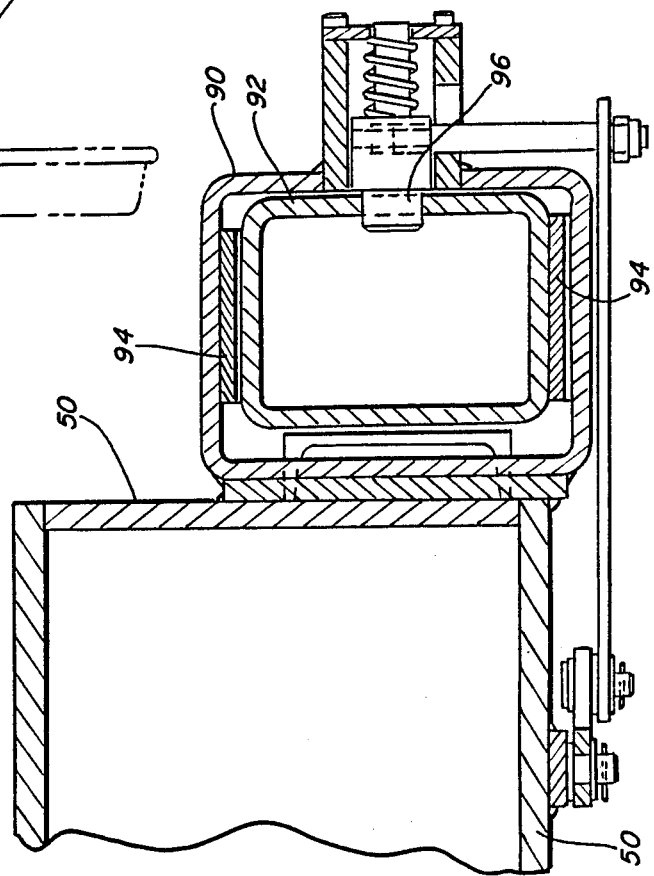
FIG. 7 is a sectional view, taken on the line 7—7 of FIG. 3A, of the slider pocket and the locking mechanism for the telescopic gooseneck coupler of the present invention.

Coming now to the means for coupling the transition vehicle of the present invention to a road vehicle such as a hostling tractor, reference is made particularly to FIGS. 3A, 3B and 7, which depict a telescopic gooseneck-style coupler 36 having a trailer king pin 86 depending downwardly from a horizontal support plate 88 at its coupling end for attachment to a yard tractor. FIGS. 3A and 3B respectively show gooseneck coupler 36 in its retracted railroad mode position relative to the fore end of transition vehicle 10 and in its extended position for roadway travel.

On each of the two sides of central tube 50, and near the coupler end of the tube, are mounted two slider pockets 90. Pockets 90 form tunnels through which two horizontal tubes 92 may slide. The inner surfaces of pockets 90 are fitted with wear plates 94, which can be fabricated of nylon, bronze, steel or any suitable material. The clearance between these wear plates and the horizontal tubes 92 which slide through pockets 90 is minimal, on the order of 1/32 inch on a side, to permit the horizontal tubes to slide freely in a telescopic manner. Tubes 92 comprise a boom which has at its outer coupling end a support plate 88 and a downwardly projecting king pin 86. The support plate 88 on the boom is approximately 52 inches above the railroad track when the vehicle is resting on the track. In its normal closed position, the end of support plate 88 will be approximately even with and above the railway coupler 42.

The telescoping gooseneck coupler 36 is held in its selected position—in during railroad mode use and out during roadway mode use—by a spring-loaded locking pin 96 in each of the slider pockets 90, as shown in FIG. 7. Locking pin 96 engages mating holes in the pockets 90 and the tubes 92.

When the transition vehicle 10 is connected to a yard tractor by way of the gooseneck coupler 36, the yard tractor's fifth wheel is raised and the transition vehicle can be hauled while riding on its tired wheel-set axle unit 34. To prevent the disengagement of the centerplate 52 from the railtruck bolster 65, when the frame of the vehicle is so lifted, support loops 98 are mounted below the central tube 50 to hold the axles of the rail bogie.

In the rail mode of operation, transition vehicle 10 is coupled to a locomotive 16 or a preceding railcar through a drawbar or railway coupler 42 mounted at the fore end of the central tube 50 below the support plate 88 of the gooseneck coupler 36. Railway coupler 42 is generally an E-style rail coupler of the kind manufactured and sold by American Steel Foundries, Chicago, Ill. It differs from the standard railway coupler in that it has a ledge or shelf 41 on the top in addition to the shelf 43 on the bottom to allow transfer of overturning moment generated by the difference in height of the locomotive's or preceding railcar's coupling and the trailer's socket. Railway coupler 42 also serves the function of preventing vertical disengagement of the locomotive or a preceding railcar coupler. Because of the upper and lower shelves, railway coupler 42 is known as a double shelf coupler.

Figure 5:
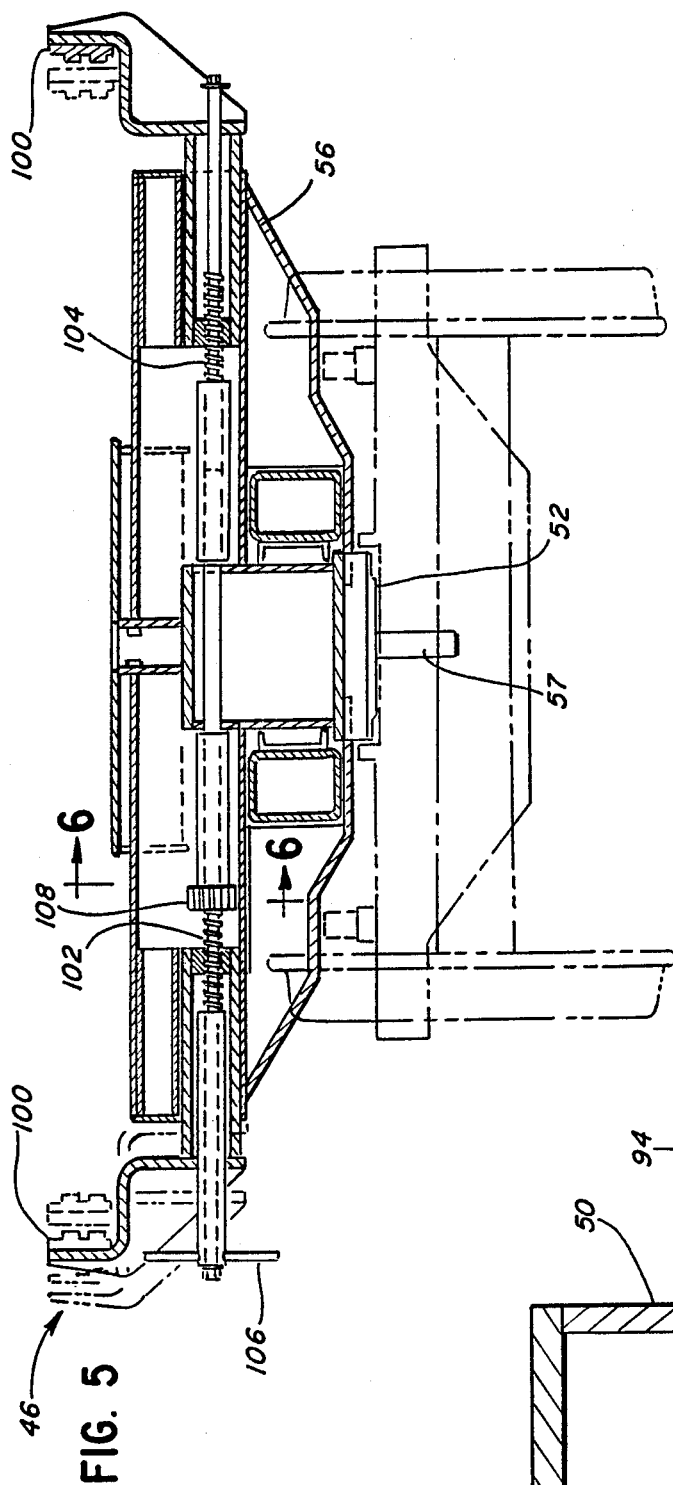
FIG. 5 is a sectional view of the claimed transition vehicle, taken on the line 5—5 of FIG. 3A, showing the adjustable clamping mechanism and the slider pockets for the telescopic gooseneck coupler.
Figure 6:
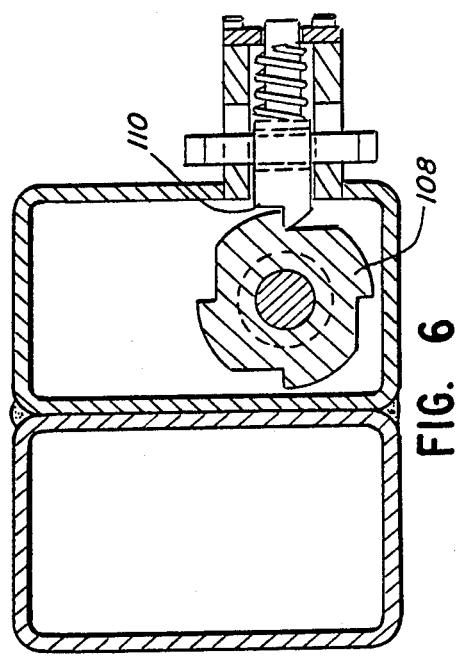
FIG. 6 is a sectional view, taken on line 6—6 of FIG. 5, showing the ratchet assembly for the clamping mechanism of the present invention.

Referring now to FIGS. 5 and 6, a clamping mechanism 46 is shown mounted transversely to the central tube 50 for securing a convertible trailer having side rails or equivalent members to the transition vehicle of the present invention. Clamping mechanism 46 is adjustable through a screw mechanism and works in conjunction with railway coupler 42 to resist the aforementioned overturning moment. Clamping mechanism 46 comprises opposing clamps 100, which separate or draw closer as right hand screw thread 102 and left hand screw thread 104 are moved in response to the turning of handle 106. The degree of clamping which results from the turning of handle 106 is determined by the number of teeth on the ratchet wheel 108. When handle 106 is turned counterclockwise, spring-loaded pawl 110 engages consecutive teeth of ratchet wheel 108. Clamps 100 are readily disengaged from the trailer side rails by releasing pawl 110 from ratchet wheel 108 and turning handle 106 clockwise. In the preferred embodiment, clamps 100 are configured to register with grooves or rails in the side of a convertible trailer.

It should be noted with respect to the above description that where mechanical means for actuating such items as the coupler pin 84, the boom locking pins 96 and the trailer body clamps 100 are described, such devices could also be operated pneumatically or hydraulically with appropriate and conventional design detail changes.

With the foregoing description of transition vehicle 10 in mind, its operation is readily understood. Assume that the vehicle has been operating in the roadway mode, or that it has been stored in the yard, and that it has been brought to a rail yard location where it is to be coupled to a train of convertible trailers, as shown in FIG. 1. At this point, the transition vehicle is coupled to a hostling tractor by way of the extended gooseneck coupler 36 as shown in FIG. 3B. The wheel-set axle unit 34 is lowered to the ground and the tractor's fifth wheel is raised. The transition vehicle is backed over the rail in front of the train of convertible trailers. Air spring 68 is deflated to raise the wheel-set axle unit 34 and the tractor's fifth wheel is lowered to permit the rail wheel-set unit 40 to engage the railroad track. The transition vehicle is then pushed back underneath the first trailer in the train such that the trailer tongue is coupled to the female coupler socket 44 on the central tube 50 and the trailer king pin is engaged by the funnel-shaped slot 72 in the load carrying shelf 59. Gooseneck coupler 36 is then disengaged from the tractor, retracted and locked into its retracted position by boom locking pins 96. The yard tractor is pulled away, and the transition vehicle is further secured to the trailer using the clamping mechanism 46. At this point, a locomotive is backed onto the track in front of the transition vehicle until its coupling components are engaged by the railway coupler 42. The transition vehicle is now configured for use in the rail mode. It will be appreciated that a similar procedure could be employed to install the transition vehicle of the present invention between a railcar and a convertible trailer. Further, it will be seen that reverse steps may be employed to convert the transition vehicle of the present invention for operation in the roadway mode. It should also be understood that certain of the above steps can be performed in a different sequence without substantially differing from the novel method described herein.

It is believed that the embodiments herein illustrated and described accomplish all of the above enumerated objects and have made apparent a number of modifications which can be made in the invention disclosed by those having the benefit of the foregoing teachings without departing from the spirit and scope of these principles. Accordingly, it is intended that this invention be limited only by the scope of the appended claims:

What is claimed is:

1. A transition vehicle convertible from roadway to rail mode of travel an vice-versa, said transition vehicle having first coupling means at its leading end capable of releasably connecting said transition vehicle to a road vehicle for roadway use utilizing a first connecting member or to a locomotive or preceding railcar for railroad use utilizing a second connecting member and second coupling means for releasably connecting said transition vehicle to a convertible trailer.

2. The transition vehicle of claim 1, further comprising a rail wheel-set axle unit in a rail-engaging position during rail use, a roadway wheel-set axle unit stored in an elevated inoperative position during such rail use and an air spring suspension system operatively connected to said roadway wheel-set axle unit to permit the selective lowering of said roadway wheel-set axle unit into a ground engaging position.

3. The transition vehicle of claim 1 wherein said first coupling means includes a gooseneck-style coupler having a trailer king pin depending downwardly from a horizontal support plate at its coupling end for attachment to a yard tractor and further includes a railway coupler positioned below the plane of such support plate and adapted to engage corresponding coupling components on the end of a locomotive or a preceding railcar.

4. The transition vehicle of claim 3 wherein said gooseneck-style coupler is telescopically disposed within said transition vehicle and can be extended outwardly from the leading end thereof to engage a road vehicle and retracted to enable the coupling of said transition vehicle to a locomotive or a preceding railcar through said railway coupler.

5. The transition vehicle of claim 1, wherein said second coupling means includes a female coupler socket mounted on top of said transition vehicle and positioned to receive the coupler tongue of a convertible trailer and further includes a load carrying shelf for receiving a trailer king pin mounted adjacent the tongue of such trailer and for supporting the lower surface of such trailer.

6. The transition vehicle of claim 1, further comprising clamping means mounted thereon and configured to engage part of a convertible trailer body coupled to said transition vehicle through said second coupling means.

7. A transition vehicle, which is convertible from roadway to rail mode of travel, for interconnecting the leading end of a convertible trailer to either a yard tractor for roadway use or a locomotive for rail use, said transition vehicle comprising:

a vehicle body;

a rail wheel-set axle for engaging a rail during rail use;

a retractable roadway wheel-set axle unit and a suspension system operatively connected to said vehicle body and said roadway wheel-set axle unit into a ground engaging position whereby said transition vehicle is adapted for roadway use;

first coupling means at the leading end of said transition vehicle for releasably connecting said transition vehicle to a yard tractor for roadway use utilizing a first connecting member or to a locomotive for railroad use utilizing a second connecting member; and second coupling means on said transition vehicle body for releasably connecting said transition vehicle to a convertible trailer.

8. A transition vehicle, which is convertible from roadway to railroad mode of travel, for interconnecting the leading end of a convertible trailer to either a yard tractor for roadway use or a locomotive for railroad use, said transition vehicle comprising:

a vehicle body;

a rial wheel-set axle unit for engaging a rail during rail use;

a retractable roadway wheel-set axle unit and an air spring suspension system operatively connected to said body and said roadway wheel-set axle unit to permit the selective lowering of said roadway wheel-set axle unit into a ground engaging position whereby said transition vehicle is adapted for roadway use;

first coupling means at the leading end of said transition vehicle, including a telescopic gooseneck-style coupler having a trailer king pin depending downwardly from a horizontal support plate at its coupling end for attachment to a yard tractor and further including a railway coupler positioned below the plane of such support plate and adapted to engage corresponding coupling components on the end of a locomotive;

second coupling means on top of said vehicle body for releasably connecting said transition vehicle to a convertible trailer, including a female coupler socket mounted on top of said transition vehicle and positioned to receive the coupler tongue of a trailer and further including a load carrying shelf for receiving a trailer king pin mounted adjacent the tongue of such trailer and for supporting the lower surface of such trailer; and clamping means configured to engage part of a convertible trailer coupled to said transition vehicle through said second coupling means.

9. The transition vehicle of claim 8 wherein said load carrying shelf of said second coupling means has a funnel-shaped entry slot to facilitate the receipt of such trailer king pin on an interconnecting convertible trailer.

10. The transition vehicle of claim 8 wherein said vehicle body comprises a central tube and a vehicle body bolster supported on said central tube and a circular thrust bearing which fits within the bowl of the railtruck bolster for rotating and limited rocking movement.

11. The transition vehicle of claim 10 wherein said telescopic gooseneck coupler comprises two tubes which are slidingly engaged at one end into two pockets fixedly mounted alongside said central tube and which are secured at the opposite end to a horizontal support plate having a trailer king pin depending downwardly therefrom, said gooseneck coupler being extendable or retractable relative to said central tube of said transition vehicle.

12. The transition vehicle of claim 11 wherein at least one of the two pockets fixedly mounted alongside said central tube is equipped with a releasable spring-loaded locking pin, said locking pin engaging mating holes in said pocket and the sliding tube therein to lock the said gooseneck coupler in its selected position in relation to said central tube of said transition vehicle.

13. The transition vehicle of claim 9 wherein said clamping means comprises two clamps which engage the sides of a convertible trailer which is coupled to said transition vehicle through said second coupling means.

14. The transition vehicle of claim 9, wherein said female coupler socket of said second coupling means includes a coupler pin internal to said socket and means for operating said coupler pin, said coupler socket positioned to receive the coupler tongue of a convertible trailer resting upon said load carrying shelf and said coupler pin being engageable with such coupler tongue to effect a coupling between said socket and such coupler tongue.

15. The transition vehicle of claim 10, further comprising support loops depending from the bottom of said central tube and enclosing the axles of said rail-wheel axle unit, said support loops restraining the circular thrust bearing of the transition vehicle from becoming disengaged from the bowl of the bolster when said central tube is lifted by a road vehicle using the telescopic gooseneck coupler.

16. The transition vehicle of claim 15, wherein said support loops are of sufficient size to permit swivel motion of the transition vehicle around the centerplate.

17. The transition vehicle of claim 15, wherein the inner surfaces of said support loops are lined with a material which is softer than the material used for the manufacture of rail vehicle axles in order to prevent axle damage from contact with the loops.

18. A transition vehicle, which is convertible from roadway to rail mode of travel, for interconnecting the leading end of a convertible trailer to either a yard tractor for roadway use or a locomotive or a preceding railcar for rail use, said transition vehicle comprising:
- a central tube supported on a centerplate configured to allow rotating and limited rocking movement within the bowl of a bolster supported by said central tube;
- a load carrying shelf mounted on the upper surface of said central tube for supporting the lower surface of a convertible trailer and receiving and engaging a trailer king pin mounted thereon;
- a female coupler socket mounted on top of said central tube and a coacting coupler pin internal thereto for engaging and holding the coupler tongue of a convertible trailer resting upon said load carrying shelf;
- a pair of opposing clamps adjustably mounted transverse to the longitudinal axis of said central tube for engaging and holding a part of a convertible trailer which is coupled to said transition vehicle through said female coupler socket and resting upon said load carrying shelf;
- a telescopic gooseneck coupler formed of two tubes slidingly engaged at one end in two pockets fixedly mounted alongside said central tube and secured at the opposite end to a horizontal support plate having a trailer king pin depending downwardly therefrom, said gooseneck coupler being extendable or retractable relative to the leading end of said transition vehicle;
- a railway coupler near the leading end of said transition vehicle and located below the plane of such horizontal support plate of said gooseneck coupler;
- a rail wheel-set axle unit for engaging a rail during rail use;
- a retractable roadway wheel-set axle unit and an air spring suspension system operatively connected to said central tube and said roadway wheel-set axle unit to permit the selective lowering of said roadway wheel-set axle unit into a ground engaging position whereby said transition vehicle is adapted for roadway use; and
- support loops depending from the bottom of said central tube and enclosing the axles of said rail-wheel axle unit, said support loops restraining the centerplate of the transition vehicle from becoming disengaged from the bowl of the bolster when said central tube is lifted by a yard tractor using the telescopic gooseneck coupler.

19. A transition vehicle as in claim 8 or 18 wherein said railway coupler is provided with both an upper and a lower shelf to allow load transfer to a corresponding coupling component on a locomotive or a preceding railcar.

20. A method of installing the transition vehicle of claim 18 between a train of convertible trailers and a locomotive and preparing it for the rail mode of travel which comprises the steps of:
- positioning the yard tractor in front of said transition vehicle and extending the gooseneck coupler on said transition vehicle and connecting it to the yard tractor;
- inflating the air spring suspension system to lower the roadway wheel-set axle unit;
- raising the coupler on the yard tractor, causing the transition vehicle to pivot about the wheel-set axle unit;
- driving the yard tractor and the attached transition unit to the site of the train and backing the transition vehicle over the rail track in front of the train of convertible trailers;
- deflating the air spring suspension system to raise the wheel-set axle unit and lowering the coupler on the yard tractor to permit the rail wheel-set unit to engage the rail track;
- pushing the transition vehicle back underneath the first trailer in the train such that said trailer is coupled to the transition vehicle by engagement of the trailer tongue and the female coupler socket and of the trailer king pin and the socket in the load carrying shelf;
- disconnecting and retracting the gooseneck coupler, and pulling the yard tractor away; and
- backing the locomotive up to engage the railway coupler near the leading end of the transition vehicle.

* * * * *

UNITED STATES PATENT AND TRADEMARK OFFICE
CERTIFICATE OF CORRECTION

PATENT NO. : 4,917,020

DATED : April 17, 1990

INVENTOR(S) : Harry O. Wicks and Theodore E. Dancu

It is certified that error appears in the above-identified patent and that said Letters Patent is hereby corrected as shown below:

In the Specification:

Column 5, line 41, "railtrack" should read --railtruck--;

In the Claims:

Column 9, line 20, "an" should read --and--;

Column 10, line 2, after the word "axle" insert the word --unit--;

Column 10, line 5, insert the following after the word "wheel-set" --unit to permit the selective lowering of said roadway wheel-set--; and

UNITED STATES PATENT AND TRADEMARK OFFICE
CERTIFICATE OF CORRECTION

PATENT NO. : 4,917,020

DATED : April 17, 1990

INVENTOR(S) : Harry O. Wicks and Theodore E. Dancu

It is certified that error appears in the above-identified patent and that said Letters Patent is hereby corrected as shown below:

Column 10, line 22, "rial" should read --rail--.

Signed and Sealed this

Thirtieth Day of April, 1991

Attest:

Attesting Officer

HARRY F. MANBECK, JR.

Commissioner of Patents and Trademarks